Jan. 22, 1946.   E. S. PETERSON   2,393,407
ELECTRICALLY CONTROLLED CAMERA DIAPHRAGM
Filed June 15, 1944   2 Sheets-Sheet 1
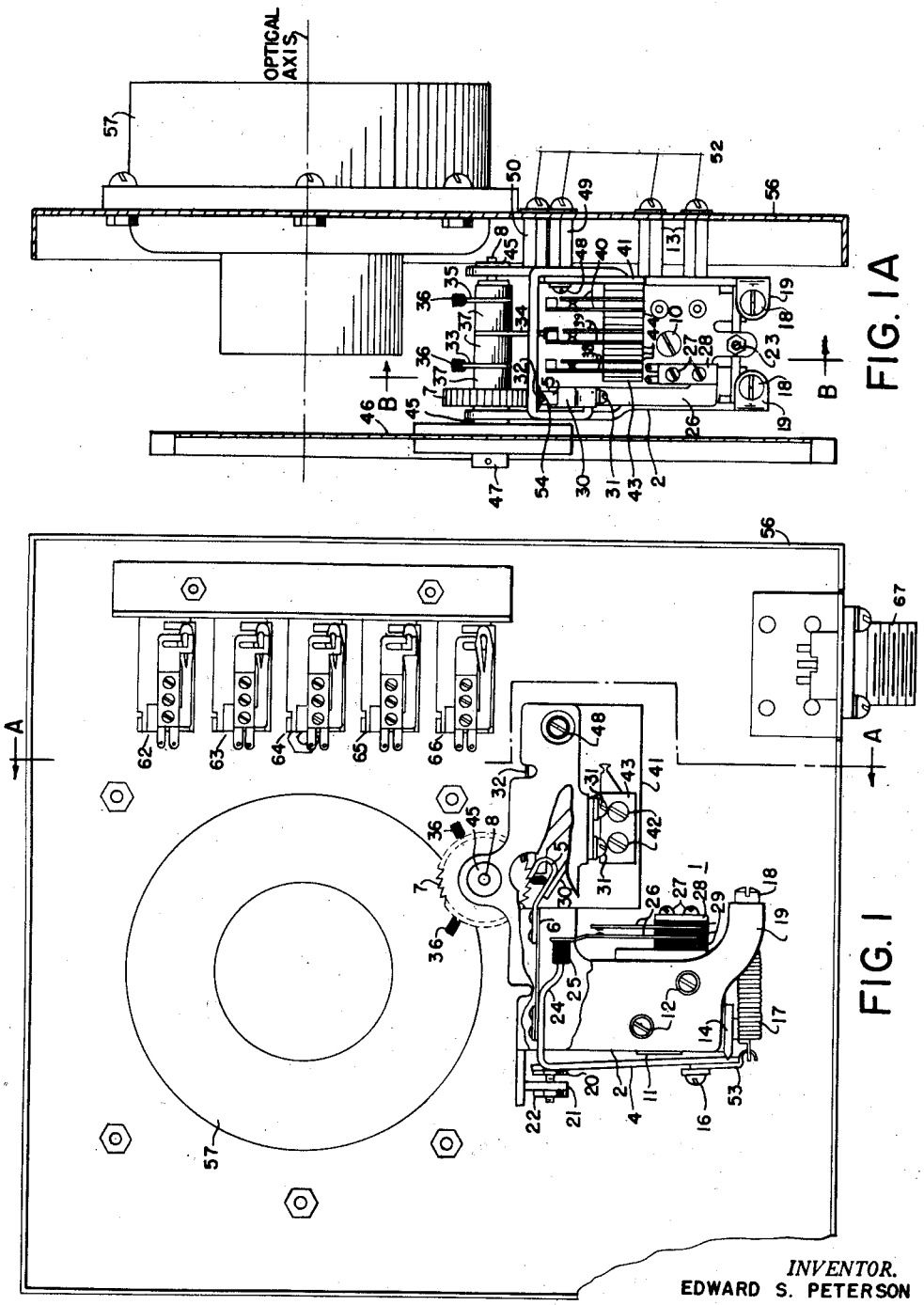
INVENTOR.
EDWARD S. PETERSON
BY
ATTORNEY Jan. 22, 1946.   E. S. PETERSON   2,393,407
ELECTRICALLY CONTROLLED CAMERA DIAPHRAGM
Filed June 15, 1944   2 Sheets-Sheet 2
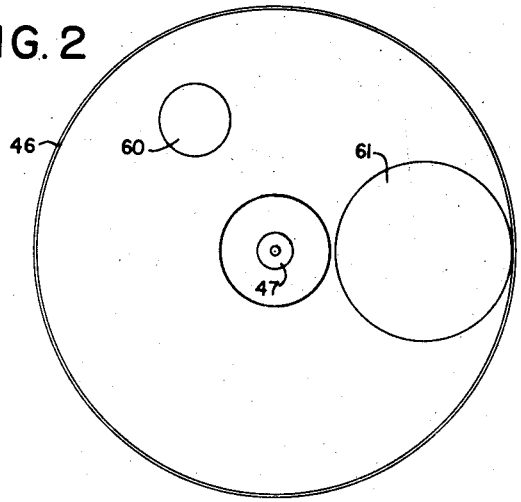
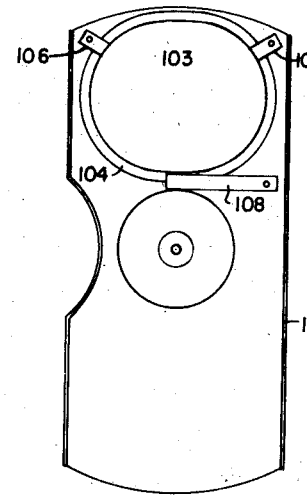
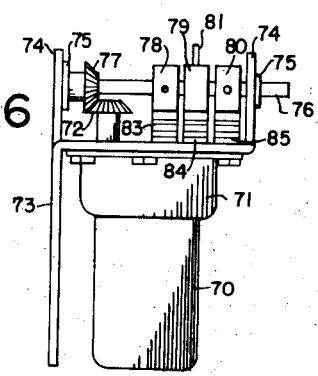
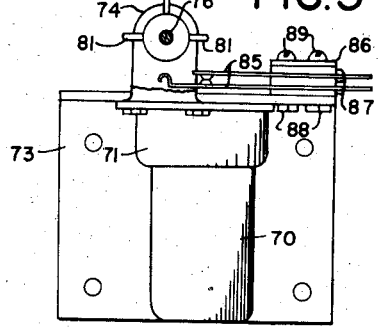
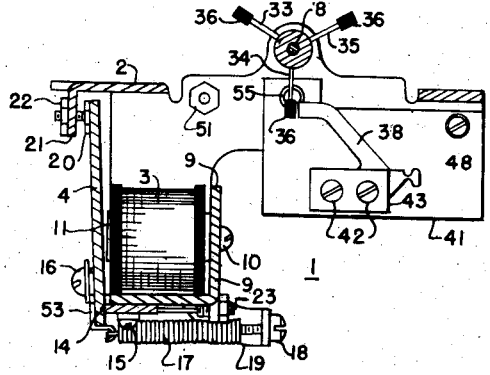
INVENTOR.
EDWARD S. PETERSON
BY
ATTORNEY Patented Jan. 22, 1946

2,393,407

UNITED STATES PATENT OFFICE 2,393,407

ELECTRICALLY CONTROLLED CAMERA DIAPHRAGM

Edward S. Peterson, Elmwood Park, Ill., assignor to Automatic Electric Laboratories, Inc., Chicago, Ill., a corporation of Delaware Application June 15, 1944, Serial No. 540,374

8 Claims. (Cl. 95—64)

The present invention pertains to electrically actuated means for controlling the transmission efficiency of the optical path of a camera, and more particularly to a means which is adapted to be controlled from a remote point.

In the embodiment chosen to illustrate the invention it is used to control the brightness of the image projected on the light sensitive element of a camera from a remote point by means of two control keys. This particular embodiment of the invention is intended to be used in conjunction with a television camera which may be carried by an airplane while in use. The details of the camera which are not directly related to the control apparatus have been omitted. It will be evident that the invention may readily be applied to other types of cameras using light sensitive plates or films. It is recognized that numerous methods have been proposed for controlling the diaphragm aperture of such cameras by means of a galvanometer movement which may be controlled by a photo-electric cell to provide automatic exposure control, but it is believed that none of these methods will accomplish the objects of the present invention.

The principal object of the present invention is to provide an electrically actuated means for selectively attenuating in predetermined steps the light transmitted through the lens to the light sensitive element of a camera.

A further object is to provide a control circuit for the electrically actuated means that is adapted to control it from a remote point.

Still another object of the invention is to provide a means for attaining the preceding objects that will be unaffected by severe vibration or shock.

Other objects of the invention will appear upon a further perusal of the specification and the accompanying drawings, in which:

Fig. 1 is a view of the apparatus from the camera side with the screening member of Fig. 2 removed.

Fig. 1A is a sectional view of Fig. 1 taken at the section A—A in the direction of the arrows with the screening member of Fig. 2 in place.

Fig. 1B is a sectional view of a portion of Fig. 1A taken at the section B—B in the direction of the arrows, Fig. 2 is a screening member consisting of a disc having two apertures and a solid section for controlling the light transmission.

Fig. 3 is a modified form of the screening member of Fig. 2 using a filter as a screening element in one of the apertures, Fig. 4 is a schematic diagram of the control circuit.

Fig. 5 is a modified form of driving mechanism as viewed from the camera side,

Fig. 6 is a side view of the modified form of driving mechanism as seen from the left of Fig. 5.

Briefly described, the invention consists of a screening member comprising a disc provided with two circular apertures of different diameters having their centers at equal radial distances from the center of the disc. The disc is attached at its center to a shaft that is rotatably secured with its axis parallel to but outside of the light path of a camera and so located that by rotating the shaft either of the apertures may be aligned with the lens, or so that the light passing through the lens is completely cut off by a solid section of the disc. An electric motor is provided to rotate the shaft. Three cams are also mounted on the shaft, one corresponding to the solid section of the disc and one corresponding to each of the apertured sections. A set of normally closed contact springs is provided for each of the cams which are located so that each cam will operate its contact spring set to the open position when its corresponding section of the disc is aligned with the lens. By closing a circuit to the electric motor in series with one of the contact spring sets, or cam springs, and a source of current the motor will rotate the shaft until the contact spring set is operated to the open position at which time the corresponding section of the disc will be aligned with the lens. A group of relays is provided to control the operation of the motor through the cam springs. Two control circuits extend from the relay group to a remote point. The relay group is arranged so that when both of these control circuits are open the solid section of the disc is aligned with the camera lens. When one of the control circuits is closed the relay group causes the electric motor to rotate the disc until the large aperture is aligned with the disc, and when the second control circuit is closed the motor rotates the disc until the small aperture is aligned with the lens. By successively closing and opening the second control circuit the two apertures are alternately aligned with the lens.

Referring now to Figs. 1, 1A and 1B, the driving mechanism 1 is a ratchet type of electric motor such as is commonly employed to perform switching operations in automatic telephone systems. It comprises a frame 2, which is partly broken away in Fig. 1 to reveal the other parts, a magnet 3 (Fig. 1B), an armature 4 to which a pawl 5 is attached through a flat spring 6 which holds the pawl 5 in engagement with the ratchet wheel 7 which is secured to a shaft 8 supported by bearings 45 in the frame 2. The magnet 3 is secured to a heelpiece 9 by means of screw 10 which passes through a clearance hole in the heelpiece 9 into a threaded hole in the iron core 11 of the magnet 3. The heelpiece 9 has the shape of a hollow cube with two open sides and is secured to the frame 2 by means of two screws 12 passing through clearance holes in the frame 2 into threaded holes in the heelpiece 9. The opposite side of the heelpiece 9 is secured to frame 2 in the same manner by hexagonal studs 13. A knife edge bearing 14 is secured to the heelpiece 9 by two screws such as 15 passing through elongated holes in the bearing 14 into threaded holes in the heelpiece 9. A screw 23 passing through a threaded hole in an ear extending from the heelpiece 9 is provided to facilitate adjustment of the bearing relative to the heelpiece. The armature 4 has a transverse V-shaped slot in it to receive the knife edge bearing 14. A stiff wire 53 formed in the shape of a V and having two hooks formed at the ends of the V is secured to the armature at the center of the V by screw 16. Two helical springs such as 17 are attached at one end to each of the hooks and are secured at their other end by screws 18 which pass through clearance holes in the arms 19 and are threaded into the helical springs 17. The tension of these helical springs tends to rotate the armature 4 in a counter-clockwise direction about the knife edge bearing 14. The movement of the armature in this direction is restricted by the stop screw 20 which is threaded into an ear 21 formed in the frame 2 and is locked in position by locknut 22. An arm 24 extending at right angles from the armature has an insulating bushing 25 secured to its end for operating at set of contact springs 26 which are secured to but insulated from the heelpiece 9 by screws 27, clamping plate 28, and insulators 29. The flat spring 6 is riveted to the arm 24 at one end and has the pawl 5 riveted to its other end. This spring is tensioned so as to force the pawl into engagement with the teeth of the ratchet wheel 7. A stop 30 is secured to an ear formed in the frame 2 by screws 31 passing through elongated holes in the ear into threaded holes in the stop 30. This stop prevents accidental clockwise rotation of the ratchet wheel 7 due to vibration or shock since any tendency of the ratchet wheel to rotate in this direction will force the pawl against the stop 30 and prevents the pawl from being disengaged from the ratchet wheel. Rotation of the ratchet wheel in a counterclockwise direction is prevented by a flat spring 32 which is secured to the frame 2 by two screws such as 54 at one end and which engages the teeth of the ratchet wheel 7 at its other end. When the armature 4 is attracted by the magnet 3 the pawl 5 is advanced to a succeeding tooth of the ratchet wheel 7 because the ratchet wheel is prevented from moving by the spring 32. The pawl 5 is not restricted in its motion when moved by the armature as the portion of the stop 30 which engages the pawl 5 and the inclined face of the teeth of the ratchet wheel 7 are substantially parallel.

When the magnet 3 is de-energized the armature 4 is restored by the helical springs 17 causing the pawl 5 to rotate the ratchet wheel 7 through an angle equal to the pitch of one tooth. Any tendency of the ratchet wheel to rotate further than one tooth will be resisted by the pawl 5 striking the stop 30 as previously described. Three cams 33, 34, and 35, each having an insulating bushing 36, are secured to the shaft 8 between collars 37. Three sets of normally closed contact springs 38, 39, and 40, are mounted on a plate 41 so as to be operated by their corresponding cams 33, 34, and 35, respectively. These contact springs are secured to but insulated from the plate 41 by means of screws 42, clamping plate 43, and insulators 44. One contact spring of each set is longer than its mate and has its tip formed in the shape of a V. It is this portion of the spring that is engaged by the insulating bushing 36 of the corresponding cam when the pawl 5 is engaged with a particular one of the teeth of the ratchet wheel 7. The plate 41 is secured to the frame 2 by a screw 48 passing through holes in the plate 41 and the frame 2 into a threaded hole in a hexagonal stud 49 and and also by a second screw 55 and a nut which is not shown. A fourth hexagonal stud 50 is secured to the frame 2 by a nut 51. The four hexagonal studs 13, 49, and 50 are used to support the frame 2 from the mounting plate 56 by screws 52 passing through clearance holes in the mounting plate 56 into threaded holes in the hexagonal studs 13, 49, and 50.

The shaft 8 is rotatably secured by bearings 45 which are forced into holes in the frame 2. The screening member 46 is secured to the shaft 8 by a set screw in the hub 47 of the screening member.

The camera lens is secured in a conventional focusing mounting 57 having a flange which is bolted to the mounting plate 56. The control relays 62 to 65 and the interrupter relay 66 are mounted on an angle strip which is bolted to the mounting plate. A socket 67 is provided for connecting the external leads to the battery and to the control keys. The internal cable wiring has been omitted for clarity.

The screening member 46, which was omitted from Fig. 1 to reveal the mechanism, is shown in Fig. 2 as it would appear if shown in Fig. 1 but reduced to one-half the scale of Fig. 1. It consists of a thin metal disk having its edge spun over to form a flange which stiffens the disk. A hub 47 having a central hole to fit the shaft 8 of Fig. 1 is secured to the disk at its center. Two different sized circular apertures 60 and 61 are provided in the disk having their centers at equal radial distances from the center of the disk so that either aperture can be aligned with the optical axis of the lens when the disc is mounted on the shaft 8 of Fig. 1.

A modified form of the screening member is shown in Fig. 3, which is also reduced to one-half the scale of Fig. 1. In this case only one aperture is provided which is of oval shape. The aperture is covered by a filter 103, which may be a color filter or a neutral filter, and consists of a thin membrane cemented to a rigid frame 104. The frame 104 is attached to the plate 105 by three lugs 106, 107 and 108. Lug 108 is pivotally secured to the plate 105 at one end by a rivet to permit removal of the filter from the plate 105. Instead of providing a large aperture like 61 in Fig. 2 a section of the plate 105 is completely cut away.

A modified form of driving mechanism is shown in Figs. 5 and 6 using an electric motor 70 in place of the ratchet motor 1 of Fig. 1. The motor 70 drives the miter gear 72 through the gear box 71 to which the motor is directly attached. The gear box is bolted to an angle bracket 73 which has two extending ears 74. Bearings 75 are forced into holes in these ears to support shaft 76. A second miter gear 77 which engages miter gear 72 is secured to shaft 76. Three cams 78, 79 and 80, consisting of metal collars having insulating buffers 81 inserted in them are secured to shaft 76 by set screws. Three normally closed sets of contact springs 83, 84 and 85 are secured to the angle bracket 73 by six screws such as 89, passing through three clamping plates such as 86, insulators such as 87, and holes in the angle bracket 73 into six nuts such as 88. Each of these sets of contact springs is aligned with one of the cams 78 to 80 so as to be operated to the open position by the buffer 81 of its associated cam when the shaft 76 is in a particular position. It will be noted that these cams have been shown displaced at ninety degrees to each other, corresponding to the ninety degree angles between the solid section, the cut away section, and the filter section of the screening member shown in Fig. 3. The cams on the driving mechanism 1 are shown displaced at 120 degree intervals corresponding to the solid section and the two apertured sections of the screening member shown in Fig. 2. It is to be understood that either of these sets of cams can be adjusted to any desired angular displacement to correspond with the angular displacement between the several sections of either screening member, and further that additional cams and additional sections in the screening member may be used. When the driving mechanism shown in Figs. 5 and 6 is used the angle bracket 73 is bolted to the mounting plate 56 of Fig. 1 so that shaft 76 will be located in the same position as shown for shaft 8.

The operation of the driving mechanism and the control circuit will now be described in connection with the circuit diagram of Fig. 4. The equipment is shown at normal with the solid section of the screening member 46 aligned with the center lines 90 of the camera lens which completely blocks the light transmitted through the lens. Operation of key 91 closes a circuit to relay 65. Relay 65 operates and closes a circuit at contacts 92 through contacts 93, cam springs 40, and contacts 94 to stepping magnet 3. Stepping magnet 3 attracts its armature to advance the pawl 5 one tooth and operates contacts 26 to close a circuit to relay 66. Relay 66 operates and opens the circuit to magnet 3 at contacts 94. Magnet 3 releases its armature causing the ratchet wheel 7 to rotate cams 33 to 35 and screening member 46 through an angle equal to the pitch of one tooth. Restoration of the stepping magnet armature also opens the circuit to relay 66 at contacts 26 causing it to restore and reclose the circuit to stepping magnet 3. This cycle of operations of stepping magnet 3 and relay 66 continues until the ratchet wheel, etc., has been rotated to the position where aperture 61 is aligned with the center lines 90 of the camera lens, at which time cam 35 opens the circuit to the stepping magnet at cam springs 40 to prevent any further stepping. The screening member will remain in this last position as long as key 91 remains closed. Restoration of key 91 releases relay 65 which opens a second point in the first described circuit to the stepping magnet and closes a second circuit to it at contacts 92 through cam springs 39 and contacts 94. Stepping magnet 3 and relay 66 again operated successively as previously described to rotate the ratchet wheel 7 and screening member 46 until they are again in the normal position at which time cam springs 39 will be operated by cam 34 to open the circuit to the stepping magnet to prevent further operation. Assuming that key 91 has been operated, when key 95 is operated it closes a circuit to relay 62. Operation of relay 62 closes a circuit to relay 63 at contacts 96. Relay 63 operates, prepares a circuit to relay 64 at contacts 100, and transfers the ground from operated contacts 92 through contacts 93 from cam springs 40 to cam springs 38 causing the stepping magnet and relay 66 to again operate as previously described and thus rotate the screening member until aperture 60 is aligned with the lens axis at which time cam springs 38 will be operated by cam 33 to stop further rotation of the screening member 46.

Restoration of key 95 opens the circuit to relay 62 which restores and opens the operating circuit to relay 63 at contacts 96. Relay 64, which was previously short-circuited at contacts 96, now operates in series with relay 63. Relay 64 prepares its holding circuit at contacts 97 and opens a further point in the operating circuit for relay 63 at contacts 98. A succeeding operation of key 95 again operates relay 62 which closes a holding circuit to relay 64 and short-circuits relay 63 at contacts 99 through contacts 97. Relay 63 restores, opens the operating circuit to relay 64 at contacts 100, and transfers the ground from operated contacts 92 through contacts 93 from cam springs 38 to cam springs 40. The stepping mechanism is thus caused to rotate the screening member to the position where aperture 61 is aligned with the lens. The second restoration of relay 62 upon the release of key 95 opens the holding circuit to relay 64 at contacts 99 causing it to release. Since only a momentary operation of key 95 is required it is preferably of the non-locking type. It is thus apparent that successive operations of key 95 will cause the apertures 60 and 61 to be alternately aligned with the lens. Contact 101 of relay 65 is provided so that relays 63 and 64 will be released in case they are operated at the time key 91 is restored to insure that a particular one of the apertures will be selected when key 91 is again operated regardless of which aperture was previously in use.

When the modification of the driving mechanism shown in Figs. 5 and 6 is employed relay 66 is not used, lead 102 is then connected directly to the motor 70. Other than this the operation is identical to that described for the ratchet motor.

It is apparent that the control keys may be located at a point remote from the camera, for instance, in a television station they may be located in the monitoring booth where the operator can observe the effect of changing the diaphragm stop of the television camera, which is located in the studio, upon the transmitted picture signal. Also when the television transmitter is mobile these control circuits may be operated by relays which are controlled over a radio link from the receiving point.

Having described and illustrated the invention, what is considered new and is desired to secure by Letters Patent is pointed out in the subjoined claims.

What is claimed is:

1. In combination with a camera lens, a screening member having a plurality of sections each arranged to attenuate the light transmitted through the lens to a different predetermined degree when aligned therewith, bearing means rotatably securing said screening member so as to permit any one of said sections to be aligned with the lens, electrical driving means operated to rotate said screening member, cam means rotated by said driving means with said member, normally closed switches positioned in operative relationship with said cam means, each of said switches corresponding to one of said sections, said switches being successively opened by said cam means as the corresponding ones of said sections become aligned with the lens, and means for completing an energizing circuit to said driving means through any one of said switches.

2. A combination as claimed in claim 1 in which one of the sections of said screening member is opaque whereby the light transmitted through the lens is completely blocked when said one section is aligned therewith.

3. A combination as claimed in claim 1 in which said last means comprises a group of relays; two keys connected to said group of relays; a first energizing circuit for said driving means including one of said switches and normally closed contacts on one of said relays; a second energizing circuit for said driving means including a second one of said switches, normally closed contacts on a second one of said relays, and normally open contacts on said one relay; a third energizing circuit for said driving means including a third one of said switches, normally open contacts on said second relay, and normally open contacts on said one relay; said one relay operated in response to the operation of one of said keys; said second relay operated in response to the operation of the other of said keys; a third one of said relays operated in response to the restoration of said other key causing said second relay to restore in response to a subsequent operation of said other key; said second relay restored causing said third relay to restore in response to a subsequent restoration of said other key; whereby a first section of said screening member is normally aligned with the lens, a second section becomes aligned with the lens in response to the operation of said one key, a third section becomes aligned with the lens in response to the operation of said other key, and said second and third sections alternately become aligned with the lens in response to successive operations of said other key.

4. In combination with a camera lens, a shaft, a screening member secured thereto having a plurality of sections each arranged to attenuate the light transmitted through the lens to a different predetermined degree when aligned therewith, bearing means rotatably securing said shaft so as to permit any one of said sections to be aligned with the lens, a plurality of cams secured to said shaft each corresponding to one of said sections, a normally closed switch associated with each of said cams, said switches being successively opened by said cams as the corresponding sections of said screening member become aligned with the lens, an electric motor operated to rotate said shaft, and means for completing an energizing circuit to said motor through any one of said switches.

5. In combination with a camera lens, a plate having a plurality of different sized apertures therein, bearing means rotatably securing said plate so as to permit any one of said apertures to be aligned with the lens, electrical driving means operated to rotate said plate, cam means rotated by said driving means with said plate, normally closed switches positioned in operative relationship with said cam means, each of said switches corresponding to one of said apertures, said switches being successively opened by said cam means as the corresponding ones of said apertures become aligned with the lens, and means for completing an energizing circuit to said driving means through any one of said switches.

6. In combination with a camera lens, a shaft, a plate secured thereto having a plurality of different sized apertures therein, bearing means rotatably securing said shaft so as to permit any one of said apertures to be aligned with the lens, a plurality of cams secured to said shaft each corresponding to one of said apertures, a normally closed switch associated with each of said cams, said switches being successively opened by said cams as the corresponding apertures become aligned with the lens, an electric motor operated to rotate said shaft, and means for completing an energizing circuit to said motor through any one of said switches.

7. In combination with a camera lens, a screening member having a plurality of sections each arranged to attenuate the light transmitted through the lens to a different predetermined degree when aligned therewith, bearing means rotatably securing said screening member so as to permit any one of said sections to be aligned with the lens, electrical driving means operated to rotate said screening member, a plurality of control circuits therefor each corresponding to one of said sections, means rotated by said driving means with said member successively opening a point in each of said circuits as the corresponding ones of said sections become aligned with the lens, and means for energizing said driving means over any one of said control circuits.

8. In combination with a camera lens, a plate having a plurality of different sized apertures therein, bearing means rotatably securing said plate so as to permit any one of said apertures to be aligned with the lens, electrical driving means operated to rotate said plate, a plurality of control circuits therefor each corresponding to one of said apertures, means rotated by said driving means with said member successively opening a point in each of said circuits as the corresponding ones of said sections become aligned with the lens, and means for energizing said driving means over any one of said control circuits.

EDWARD S. PETERSON.